United States Patent [19]
Colby

[11] 3,735,298
[45] May 22, 1973

[54] ONE-WAY MOTION DETECTION SWITCH

[76] Inventor: Charles E. Colby, 740 S. Locan Street, Fresno, Calif. 93706

[22] Filed: Sept. 28, 1970

[21] Appl. No.: 76,330

Related U.S. Application Data

[62] Division of Ser. No. 686,660, Nov. 29, 1967, Pat. No. 3,559,205.

[52] U.S. Cl. .................. 335/206, 335/207, 340/70
[51] Int. Cl. ............................................. H01h 36/00
[58] Field of Search .................. 335/205, 206, 207; 340/70

[56] References Cited

UNITED STATES PATENTS 3,320,562  5/1967  Germunton ........................ 335/207
3,249,714  5/1966  Hyink et al. ...................... 335/205 X

FOREIGN PATENTS OR APPLICATIONS 1,404,208  5/1965  France ............................. 335/207

Primary Examiner—Roy N. Envall, Jr.
Attorney—Huebner & Worrel

[57] ABSTRACT

Apparatus including a signal generator for activating warning devices to alert the operator of a motor vehicle, the signal generator being controlled by circuitry including reed switch systems opened and closed by the movement of magnets with the N-S axis thereof passing across the longitudinal axis of the switch system or perpendicular to such axis for controlling a variable timing circuit or a relay.

3 Claims, 10 Drawing Figures

Patented May 22, 1973

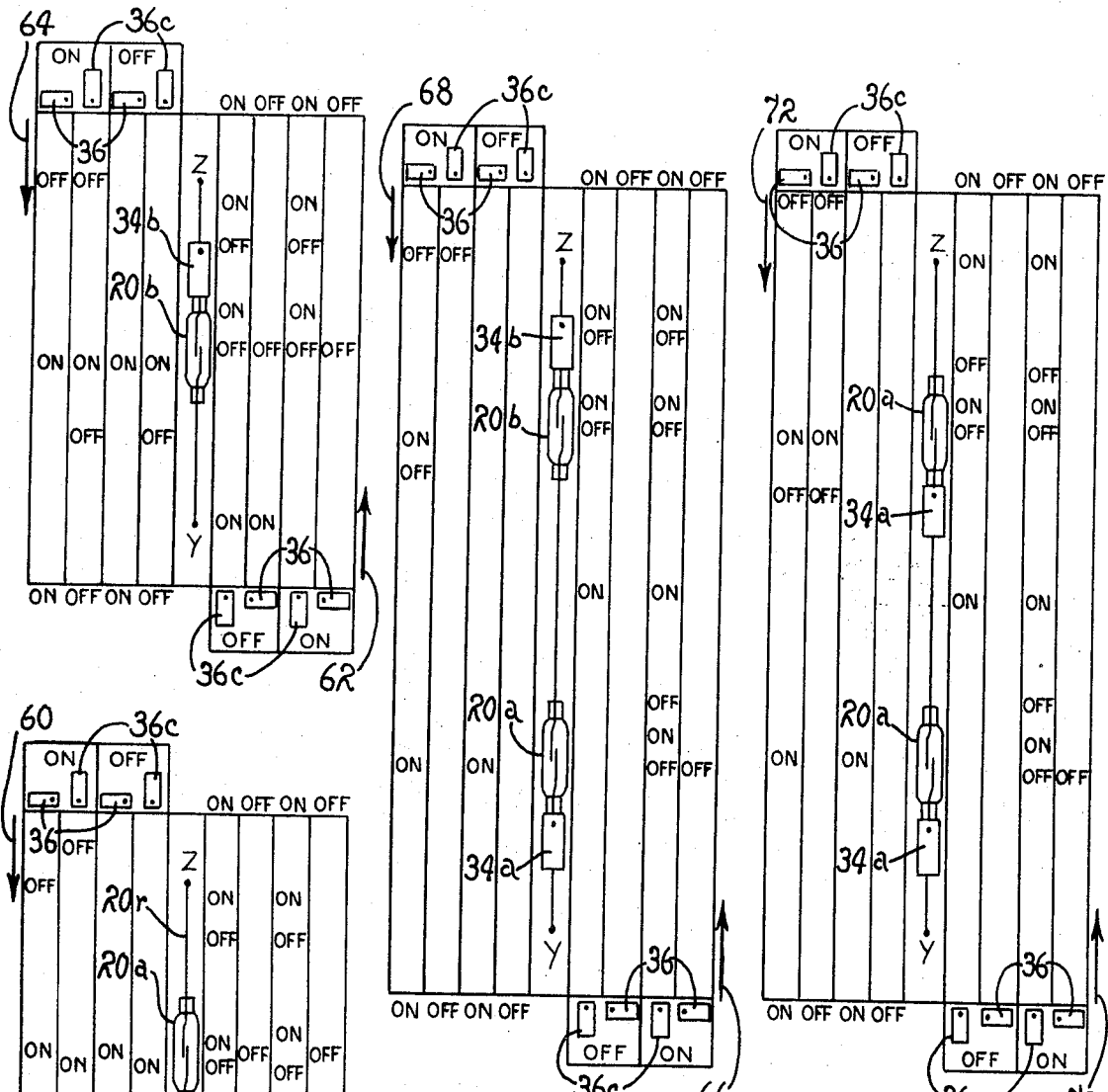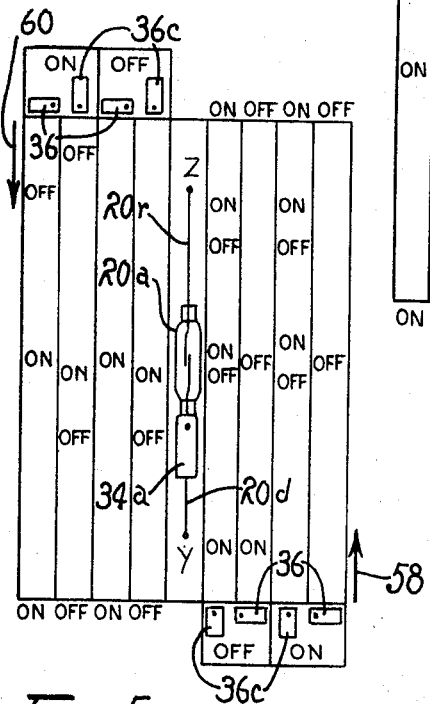

ONE-WAY MOTION DETECTION SWITCH

This is a divisional application of application Ser. No. 686,660, filed Nov. 29, 1967 now U.S. Pat. No. 3,559,205.

BACKGROUND OF INVENTION

The present invention relates to safety apparatus for alerting the driver or operator of a motor vehicle and more particularly to apparatus employing novel reed switch systems for controlling devices for automatically generating a signal, preferably an audio signal, for alerting the motor vehicle operator with regard to the operation of the vehicle as well as other uses and applications.

Systems have been proposed which are based on the reversal rate or the rate at which oscillations are imparted to the steering wheel of a motor vehicle by the operator thereof during normal driving. The periodic reversal of the steering wheel is utilized to inhibit a warning system that automatically goes into action when such oscillations cease or the normal rate thereof is reduced, thereby alerting the driver that there has been a departure from his normal alert driving. As evidenced by U.S. Pat. Nos. 2,848,712, 2,875,430, 3,106,891 and 3,227,998, various attempts have been made to reduce the complexity, cost and the parts which are subject to failure by wearing out and the like, of such systems.

SUMMARY OF INVENTION

It is, therefore, an object of the present invention to provide a safety apparatus for alerting a motor vehicle driver which is simple in construction, reliable in its operation and economical to produce.

Another object is to provide a safety apparatus which utilizes magnetic devices to avoid mechanical connections between a movable part of a vehicle, such as the steering wheel, and a fixed part of the vehicle, such as the steering column.

A still further object is to provide a safety apparatus which alerts the driver during rearward movement of the vehicle and simultaneously warns nearby bystanders of such movement.

An additional object is to provide a variable timing circuit employing a transistor and composed of a relatively few parts which is unique and provides greater durability and reliability.

A still further object is to provide apparatus for detecting the movement of a movable part in a predetermined direction.

Still another object is the provision of a control means for a signal generator which utilizes a unique reed switch system and activating magnet means in a novel manner to provide a more reliable warning system by avoiding mechanical interconnections between relatively movable parts and attendant wear and tear of such parts resulting from such interconnection.

An additional object is to provide a warning apparatus of the type referred to which possesses greater reliability than present day systems because of a lower power requirement and greater avoidance of components susceptible to failure by wear or burning out.

These and other objects and advantages are achieved by providing an audio signal generating means controlled by circuitry including reed switch systems closed and opened by the movement of magnet means with the N-S axis thereof passing across the longitudinal axis of the reed switch means or perpendicular to such axis, the reed switch system in one instance controlling the output of a variable timing circuit and in another instance controlling a relay or switch device for coupling power to the signal generating means.

BRIEF DESCRIPTION OF DRAWINGS

FIG. 5 is a diagram illustrating the positional effect of an activating magnet during movement thereof in one direction and then in the opposite direction with respect to a reed switch and its biasing magnet for controlling the condition of a circuit between two points.

FIG. 6 is a diagram similar to that of FIG. 5 but with the biasing magnet arranged differently.

FIGS. 7 through 10 are diagrams illustrating the positional effect of an activating magnet during movement thereof with respect to a plurality of combinations of serially connected reed switches and their biasing magnets for controlling the condition of a circuit between two points.

DESCRIPTION OF EMBODIMENT

Figure 1:
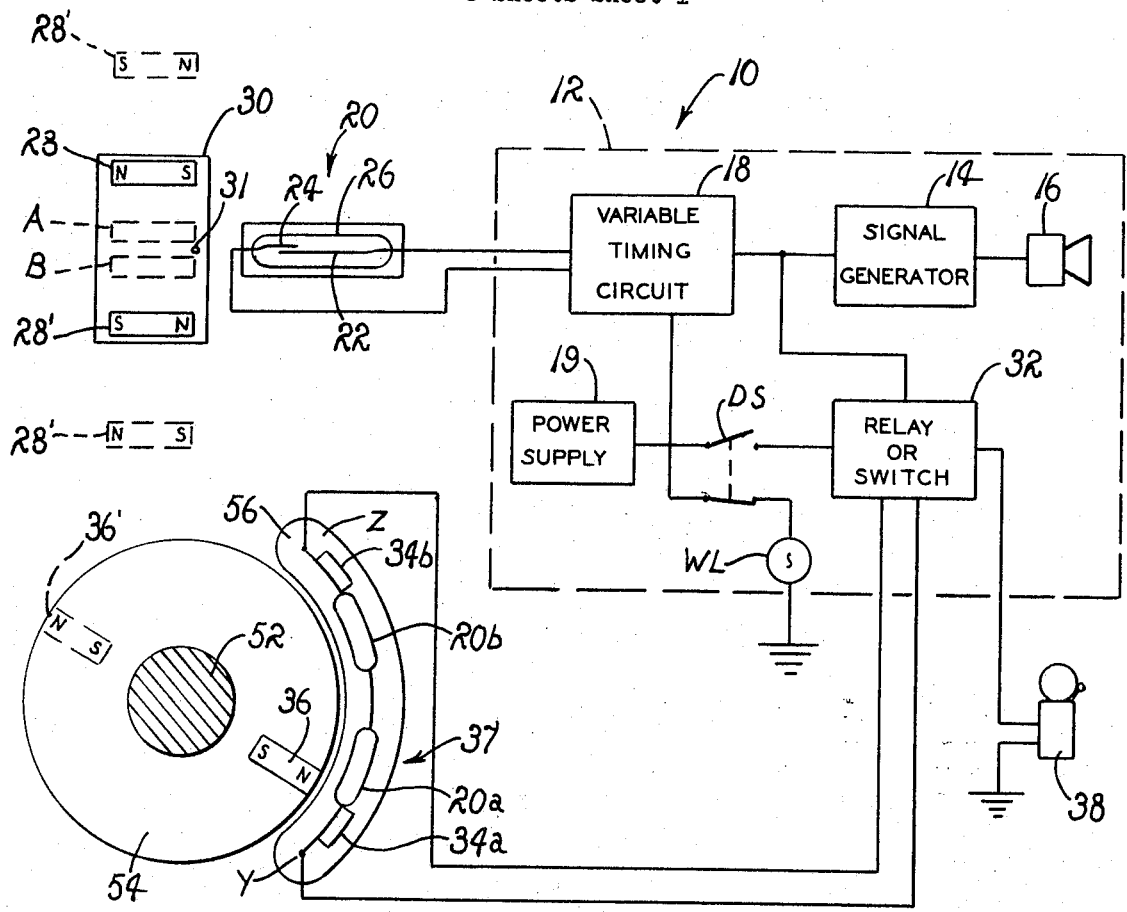
FIG. 1 is a diagram schematically illustrating the safety apparatus of the present invention for alerting the operator of a motor vehicle.

Referring to the drawings, there is schematically illustrated in FIG. 1 a safety apparatus embodying the principles of the present invention and designated generally by reference numeral 10. The apparatus includes a case or container 12 which houses a signal generator 14 the signal output of which is adapted to energize or activate a warning device 16 which, when activated, produces a sound, or a light or both, if desired.

Signal generator 14 may be an oscilator or other suitable device and is controlled by a variable timing circuit 18 the action of which is governed by a switch system based on the state of a switch device 20 connected thereto. Power for the apparatus is obtained from a power supply 19, Switch 20 is of the conventional magnetic reed type which is commercially available and has a pair of electrically conducting overlapping reed elements 22 and 24 of magnetic material adapted to move relative to each other for closing and opening a circuit. Reed elements 22 and 24 are housed in an elongated envelope or capsule 26 of suitable material with a reed element mounted in each end of the envelope and extending inwardly generally along the longitudinal axis of the envelope into overlapping relation. Where the overlap of the reed elements is midway of the envelope, the reed switch is referred to a center gap reed switch. In the case where the overlap is nearer one end of the envelope it is called an offset gap reed switch. U.S. Pat. No. 3,823,274 shows and describes various forms of reed switches.

Heretofore, actuation of a reed switch has usually been by relative movement between a permanent magnet or magnets and the reed switch with the N-S axis of the magnet or magnets generally parallel to the longitudinal axis of the switch.

Applicant has discovered that finer control and sharper actuation of a reed switch is obtained by moving a permanent magnet so that the N-S axis thereof is moved into and out of alignment with the longitudinal axis of the reed switch at an optimum distance. To this end, there is provided an activator magnet 28 of permanent type mounted with N-S axis thereof generally parallel to the longitudinal axis of reed switch 20 and movable into and out of linear alignment therewith. Thus, when activator magnet 28 is positioned as shown in solid lines, switch 20 is in the open condition. However, when there is relative movement placing the magnet and switch closer together and the magnet is in position A, shown in dotted lines, the switch closes with a snap action and remains closed until the magnet reaches position B, shown in dotted lines, after which the switch goes to open condition again as the magnet passes therebeyond. With reverse relative movement, the switch snaps closed at position B and opens upon passing position A. It is therefore seen that there is switch closure when the magnet and switch are in substantial alignment. It will be appreciated, of course, that the positional effect of the activator magnet between positions A and B may be utilized to open a normally closed reed switch. Any type of reed switch may be employed. However, the offset gap type is preferred because the end of the envelope nearer the overlap may be located in close adjacency to the path of the activator magnet which provides sharper actuation with a small magnet and a small optimum distance between the switch and magnet. The switch 20 and magnet 28 may each be encased in suitable dielectric material, such as plastic, for example, and suitably secured.

When a single activator magnet is used, either pole may be placed in adjacency to the switch 20. In some applications, where more frequent switch action is desired, an additional activator magnet or magnets 28' may be employed. In such case, the magnets are spaced with opposite poles in adjacency as shown in FIG. 1. In order that the magnets be maintained in their proper relationship, they are preferably encased in a slab or plate 30 of epoxy resin or other suitable dielectric material, the plate being marked with a dot 31 for purposes later appearing.

Signal generator 14 is also controlled by a relay or a solid state switch device 32 which is of conventional type and is normally in open circuit condition and controlled by a plurality of reed switches 20a and 20b connected in series as shown in FIG. 1. Associated with the switch 20a is a biasing magnet 34a, and with switch 20b a biasing magnet 34b. The switches and the associated magnets form a switch system which is stationarily supported with respect to an activating magnet 36 mounted for movement relative thereto at an optimum distance therefrom. This switch system, designated generally by numeral 37, is intended to alert the vehicle operator when the vehicle is moving rearwardly and to warn bystanders of such movement. For this purpose there is connected to relay 32, for actuation thereby, a warning device 38, such as a bell, horn, or the like, mounted exteriorly of the vehicle. To silence the device 38 after the vehicle has been backed to the point desired, a switch DS is provided to disable the relay 32 by cutting off power from power supply 19, a warning light WL indicating such disablement.

Figure 2:
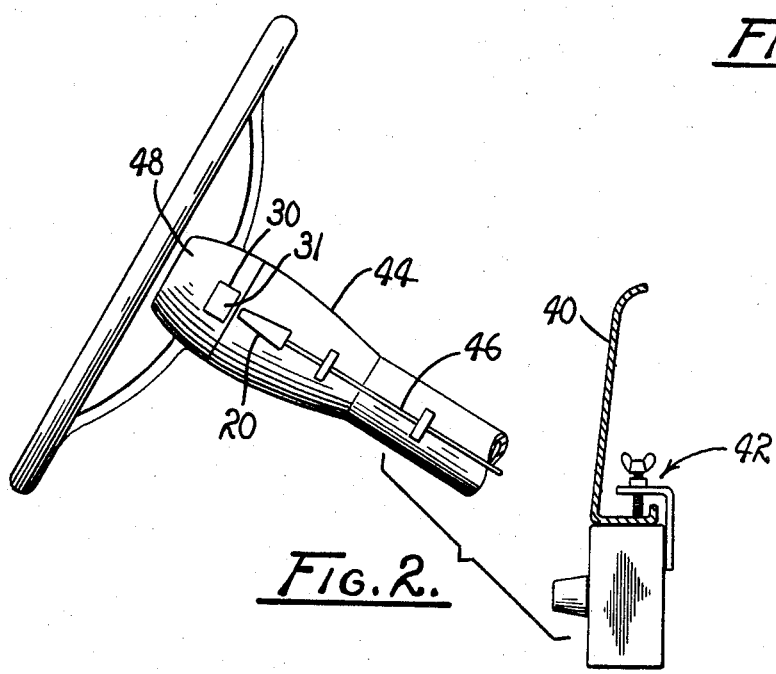
FIG. 2 is a fragmentary view illustrating one manner of attaching parts of the apparatus to a motor vehicle.

Turning to FIG. 2, there is illustrated a manner of supporting the container 12, reed switch 20 and plate 30. Container 12 may be conveniently carried anywhere in the vehicle within reach of the operator. For example, it could be connected to a flange or lip on a dashboard 40 of the vehicle as by a screw clamp 42 or the like. The state of switch 20 is utilized to alert the vehicle operator as to his steering reversal rate and the switch may be secured to the steering column 44 or any other part of the vehicle adjacent a part moved as a result of steering, such as the steering linkage, steering shaft or steering column 44. Switch 20 may be provided with an adhesive coating covered by a protective layer of paper peeled off to adhere the switch to the vehicle part. Wires 46 extending between the switch 20 and container 12 may be fastened by pieces of tape or other securing means. Plate 30 containing the activating magnets 28 and 28' may also be provided with an adhesive backing and a layer of peelable paper for adhering the plate to the hub 48 of the steering wheel 50 or to any other part of the vehicle. It is understood, of course, that the components of the driver alerting apparatus could be built in during assembly of the vehicle at the factory.

Figure 3:
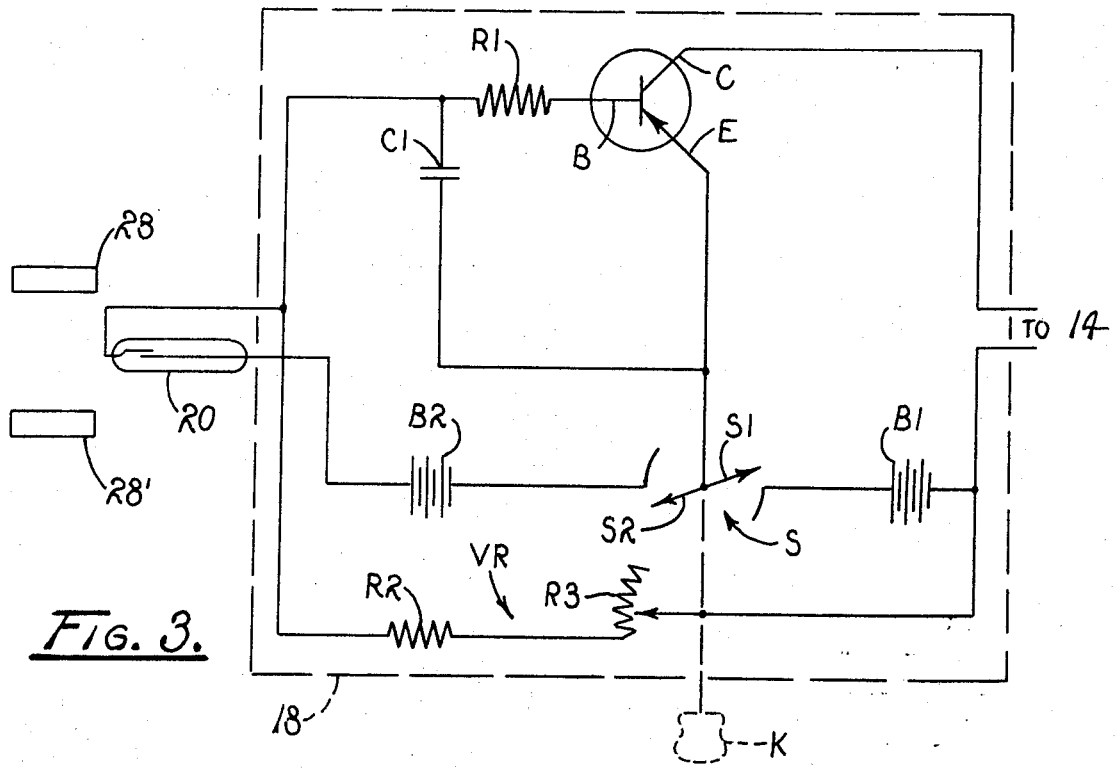
FIG. 3 is a circuit diagram schematically illustrating the variable timing circuit in the apparatus of FIG. 1.
Figure 4:
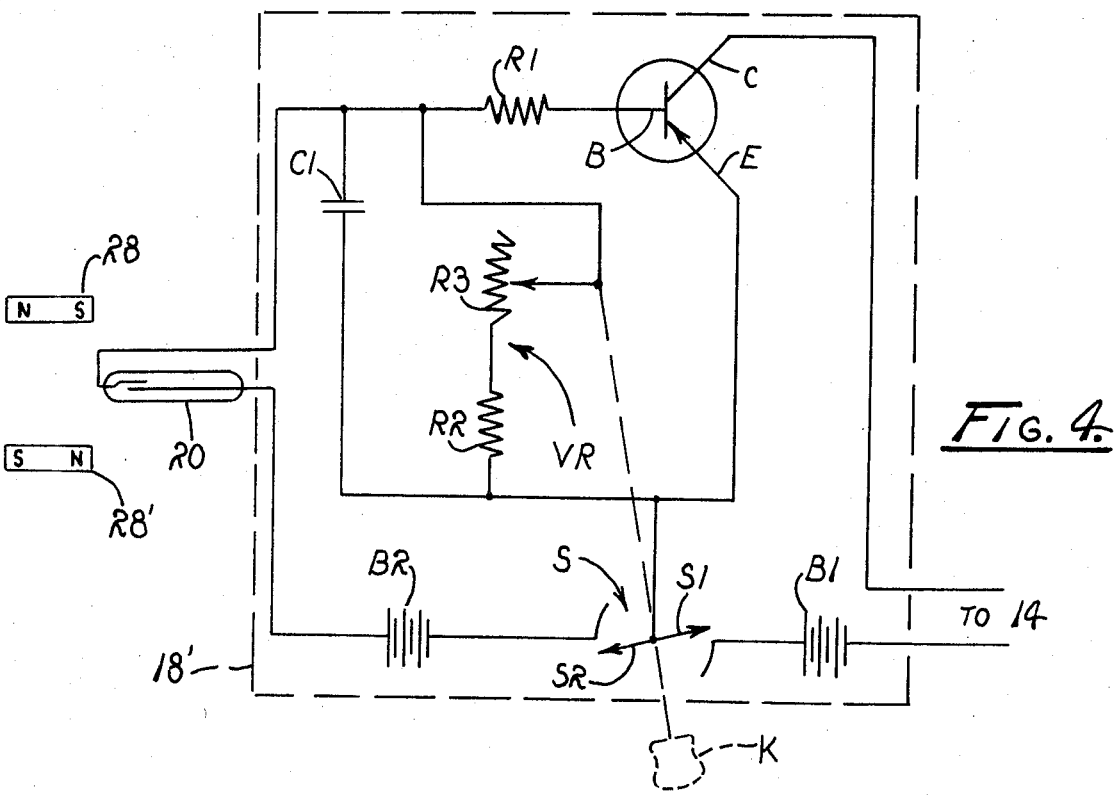
FIG. 4 illustrates a modification of the variable timing circuit of FIG. 3.

The variable timing circuit 18 may take the form shown in FIG. 3 or in FIG. 4. One element of the reed switch 20 is connected to one side of a capacitor C1 and one end of a resistor R1 and also to the other side of the capacitor through a variable resistance device VR, a power supply B1 and a switch blade S1 of a double blade switch S, all connected in series. The other element of reed switch 20 is connected to said other side of the capacitor through a power source B2 and the other switch blade S2 of the switch S. The other end of resistor R1 is connected to the base B of a transistor T, the emitter E of the transistor being connected to the other side of the capacitor C1, thus placing the capacitor in shunt or parallel with the resistor R1 and the base and emitter of the transistor. The variable resistance device VR is made up of a fixed resistor R2 and a variable resistor R3 controlled by a knob K which also controls switch S. Turning of the knob K serves to connect the emitter E of the transistor T with the power supplies B1 and B2 and varies the amount of the resistance of resistor R3 that is placed in the circuit.

The output of the circuit is across the power supply B1 and the collector C of the transistor T, which output is coupled to the signal generator 14. Thus, closing switch blades S1 and S2 connects the base of the transistor T with the power supply B1, causing the transistor T to conduct and provide a path for current from the power supply to flow to the signal generator 14, activating the same. However, when reed switch 20 is closed by movement of the activating magnets 28 and 28' then current flows from power supply B2 and biases the transistor T into cutoff which stops the flow of current from the power supply B1 causing the signal generator 14 to be inactivated. Flow of current from the power supply B2 also charges the capacitor C1, discharge of the capacitor occurring after opening of the switch 20 through a return path via resistors R2 and R3 and the base to emitter leakage, after which the transistor T conducts again, causing the signal generator 14 to be activated. The amount of time the signal generator is inactive depends upon the amount of the resistance of resistor R3 that is effectively in the circuit because of the setting of the knob K.

FIG. 4 shows an alternate form of variable timing circuit 18' in which the relationship of the parts is substantially the same as that shown in FIG. 3 except that the serially connected resistors R2 and R3 are connected across the capacitor C1. This also places the resistors in parallel with the resistor R1 and the base B and emitter E of the transistor T. When knob K of the switch S is operated to close the switch knife blades S1 and S2, the power from power supply B1 is impressed upon the base B of the transistor T through the resistors R1, R2 and R3 and directly upon the emitter E of the transistor. The voltage drop across the resistors causes a lesser voltage, that is, a negative voltage compared to the voltage in the emitter, to be present at the base of the transistor. The transistor conducts and current flows to the signal generator 14 for activation thereof. When switch 20 is closed, voltage supply B2 biases the transistor into nonconduction and charges the capacitor C1. When switch 20 is opened, capacitor C1 discharges by way of the path through the resistors R2 and R3, and base to emitter leakage, after which the transistor conducts and the signal generator 14 is again activated.

It is to be noted that because of the delay imposed by the RC network in each of the circuits, should the switch 20 close again before the end of such period, the transistor is kept from conducting and the signal generator 14 remains inactivated.

The following table illustrates circuit parameters by way of example only without being limited thereto:

TABLE I

| Item | FIG. 3 | FIG. 4 |
|---|---|---|
| B1 | 9v | 9v |
| B2 | 9v | 9v |
| C1 | 250 uf | 250 uf |
| T | PNP type | PNP type |
| R1 | 2K ohms | 2K ohms |
| R2 | 47K ohms | 47K ohms |
| R3 | 100K ohms, variable | 100K ohms, variable |

The circuit parameters of TABLE I provide a time delay of from about four to about 17 seconds by varying R3.

It will be appreciated that NPN transistors could be employed in which case the polarities of the power supplies would be reversed.

Returning to FIG. 1, the rearward movement warning switch system 37 is based on the discovery that passage of an activating magnet serves to close effectively a circuit between points Y and Z, while passage in the opposite direction does not. This will be later discussed in detail.

Accordingly, magnet 36 may be mounted on any rotating member 52 of the vehicle that rotates in one direction when the vehicle moves forward and in the opposite direction when the vehicle moves in reverse. For example, the member may be a wheel, a brake drum or part of the drive train, such as the driveshaft, transmission shaft, universal joint, rear end shaft, etc. The magnet 36 may be mounted directly on the rotating member 52 or on a suitable support 54 connected to the member to rotate therewith where the size of member 52 is too small. Similarly, switches 20a and 20b and the associated biasing magnets 34a and 34b may be directly mounted on fixed portions of the vehicle or secured to a support 56 configured to the rotating part 52 or the rotating support 54 in order that the activating magnet 36 may move relative thereto at an optimum distance therefrom. The activating magnet 36 may be disposed radially or parallel to the axis of rotation, switches 20a and 20b being properly related thereto so that the reed elements thereof are influenced by the activating magnets.

In some cases there may be a requirement for sounding of the warning device 38 before the vehicle has moved rearwardly a minimum prescribed distance. Where such distance is less than the distance the vehicle would move with one complete revolution of member 52, an additional magnet or magnets 36' may be employed and spaced around the member, as shown in FIG. 1, to activate device 38 within the required distance, care being taken that the magnets are not so closely spaced that the trailing magnet nullifies the effect of the leading magnet. If desired, magnets 36 and 36' could be mounted on a rotatable part connected by suitable gearing to rotatable part 52 in order that small changes in the position of part 52 result in considerable movement of the magnets for sweeping past a number of switch systems connected to recorders or other indicating devices for detecting such small changes.

Before proceeding with a more detailed description of the switch system 37, the positional effect of an activating magnet on each switch and its associated biasing magnet will be discussed. Referring to FIG. 5, it will be noted that reed switch 20a, which is of the center gap type, has a pair of leads 20d and 20r and that biasing magnet 34a is disposed on lead 20d next to the switch, generally aligned with the longitudinal axis thereof, and is marked with a dot to identify a selected polarity, either north or south. The biasing magnet is just large enough to hold the reed switch reliably in the opposite state of normal condition once it is put into such state by an external magnetic field, but not large enough to cause the reed switch to change state by the power of the biasing magnet alone.

Now, inviting attention to the lower right part of FIG. 5, that pole of magnet 36 which is like the pole of magnet 34a bearing the dot, is similarly marked with a dot to indicate likeness. The magnet 36 is of a size sufficient to have a localized influence on the switch and its biasing magnet at an optimum distance therefrom. The same applies to an activating magnet 36c which is adapted to be moved past the switch in conventional manner with the N-S axis thereof parallel to the longitudinal axis of the switch, whereas activating magnet 36 is adapted to be moved with the N-S axis thereof generally perpendicular to such axis of the switch and with the dotted end thereof adjacent thereto.

The positional effect of moving activating magnet 36c in the conventional manner will now be described. This will be done by tabularly indicating the approximate position of the dotted end of the magnet as it moved parallel to lead 20d, magnet 34a, switch 20a and lead 20r, the leads being suitably connected to any suitable means for indicating the condition or state of the switch such as a powered light or sound device, not shown, using the words OFF or ON to show the condition of the indicating means which is an indication of the open or closed condition of the switch, respectively, and the approximate position of the dotted end when the change occurs. Starting with the switch 20a in open or OFF condition, the dotted end of magnet 36c pointed in the same direction as the dotted end of magnet 34 and headed for lead 20d, the magnet is moved in the direction of the arrow 58. When the dotted end of the magnet 36c is about at the end of the lead 20d the switch goes ON. This state continues until the dotted end of the magnet 36c is about opposite the overlap or gap of the switch whereupon the switch goes to OFF. With but slight additional movement of the magnet 36c the switch goes to ON. As the magnet 36c approaches the end of lead 20r the switch goes to OFF and shortly afterward to ON and continues in such state as the magnet passes beyond.

Starting from the same initial condition of OFF but moving magnet 36 in the direction of arrow 58, when the dotted end of magnet 36 is about at the end of lead 20d the switch goes ON and continues in such condition until the magnet is about opposite the gap where the switch goes OFF, which is its final condition as the magnet passes beyond. It is to be noted that the final state of the switch as a result of passage of magnet 36 is opposite that of passage of magnet 36c.

Moving the magnets 36c and 36 (at different times) in the direction of arrow 58 as before but starting with the switch 20a in ON condition, it will be noted that magnet 36c causes several changes with a final state of ON, whereas with magnet 36 the switch goes to OFF, which is its final state; again a state opposite to the final state caused by passage of magnet 36c.

Starting with either OFF or ON initial condition but starting from beyond lead 20r and moving magnets 36c and 36 (at different times) in the direction of arrow 60, final states are caused which are opposite for each magnet, OFF for magnet 36c, ON for magnet 36.

If the magnets 36c and 36 are moved past the switch system closer (or further) than optimum distance there may be additional (or less) switch actuation but the overall effect remains the same.

In FIG. 6, the biasing magnet 34b is aligned next to center gap reed switch 20b but with the dotted end of the biasing magnet 34b, which is of like polarity as the dotted ends of magnets 34a, 36c and 36, directed away from the switch. Movement of magnets 36c and 36 in the direction of arrow 62 produces final states which are the same as those obtained in the case of switch 20a and magnet 34a with some differences in the points where some of the changes occur, which is attributed to the different positioning of the dotted end of the biasing magnet to the switch in FIG. 6 than in FIG. 5. The same may be said of the movement of magnets 36c and 36 in the direction of arrow 64.

Examination of the data compiled from the movements of the magnets 36c and 36 for both switches 20a and 20b reveals that in some cases there are more switch changes during movement of magnet 36c which is attributed to the effect of the undotted pole as it trails over the various parts. This probably accounts for the opposite final states pointed out before since turning magnet 36 end for end and putting it through its movements results in opposite effects.

Applicant has discovered a unique result when the biased switches are connected in series with the dotted ends of the biasing magnets headed in the same direction. One serially connected combination of the switches is illustrated in FIG. 1 wherein it is to be noted that movement of magnet 36C in the direction of arrow 66 from initial OFF and ON conditions results in final states of ON, whereas movement of magnet 36 with the same conditions results in OFF final states. And movement of magnets 36c and 36 (at different times) in the direction of arrow 68 from OFF and ON conditions results in opposite final states, OFF for magnet 36c and ON for magnet 36. It is further to be noted that movement of magnet 36 in the direction of arrow 66 starting from an OFF condition results in the switch system being open so that the circuit between the points Y and Z is never completed during such movement.

Various combinations of the reed switches and biasing magnets are, of course, possible. Another combination of center gap switches is illustrated in FIG. 8. Examination of the data in FIG. 8 reveals that movement of magnets 36c and 36 in the direction of arrows 70 and 72 results in final states similar to those obtained with the switch system of FIG. 7. The same is true of the combination of FIG. 9 using offset gap reed switches as shown.

However, when offset gap reed switches are arranged with their biasing magnets as shown in FIG. 10, different results are obtained. It is to be noted that movement of magnet 36c in the direction of arrow 78 produces final states of OFF similar to movement of magnet 36 in the same direction, although movement of magnet 36c in the direction of arrow 80 produces final states opposite to those produced by movement of magnet 36.

Examination of the data of FIGS. 7 through 10 reveals that movement of magnet 36c is not consistent in the final state produced, whereas magnet 36 when moved in the direction of arrows 66, 70, 74 and 78 from an initial condition of OFF causes no change in such condition with the result that the circuit between points Y and Z remains open.

It is therefore concluded that when the plural system is arranged with like polarities of biasing magnets headed in the same direction and an activating magnet is disposed generally perpendicular to the longitudinal axis of the switch system with the like pole thereof adjacent the axis at an optimum distance therefrom, movement of the activating magnet in the direction the biasing magnets are headed results in OFF final states and movement in the opposite direction in ON final states. Also, in going from OFF starting condition to OFF final state the circuit between points Y and Z remains open.

Thus, the plural switch system may be employed to detect movement in a predetermined direction by arranging the switch system to remain open when the activating magnet is moved in one direction but closes the switch system when movement is in the opposite direction, the direction it is desired to detect.

The single switch system with activating magnet perpendicular thereto could probably be adapted to detect movement in a predetermined direction but would require connection through appropriate circuitry or devices which recognize and differentiate between a short ON pulse as the system goes from initial OFF condition to a final state of OFF compared to the pulses when otherwise in the ON condition.

In the application of the safety apparatus of FIG. 1 to a motor vehicle, container 12 is suitably mounted or supported within the vehicle as by clamping to the dashboard and plate 30 containing the activator magnets 28 and 28' is affixed to the steering wheel of 48 so that the edge of the plate 30 with a dot 31 on the plate is very close to the gap between the hub and the steering column 44. The plate, of course, is attached adhesively by peeling the protective paper layer therefrom, the affixing surface being suitably cleaned of dust and oil as by wiping with a soft cloth or the like so that the adhesive backing will stick well. The vehicle is then driven at cruising speed on a straight road and with the assistance of a passenger a mark is put on the steering column 44 directly across from the dot 31 when the vehicle is going as straight as possible down the road. This establishes the proper positional relationship of the activator magnets and the reed switch device 20. The protective paper is then peeled from the adhesive backing of the switch device and it is affixed to the steering column centered over the aforementioned pencil mark pointing to the plate 30 and about 1/16 of an inch therefrom. The wire from the switch device is then taped or otherwise secured to the steering column, any excess of wire being coiled and taped up under the dashboard out of sight. The steering wheel is then turned so that the plate 30 is moved to center the switch device with respect to the activator magnets, that is, with the switch device pointing at the dot 31. Then, while maintaining the steering wheel stationary, the driver alert apparatus 10 is switched on by turning the knob K fully in order to place the major portion of the variable resistance in the circuit. The warning device 16 should then be heard, whereupon the steering wheel is moved so that the dot 31 is no longer in alignment with the switch device 20 and the latter is near one end of the plate 30 substantially aligned with an activating magnet. Should the warning device stop with but slight turning of the steering wheel before the switch device reaches the position near the end of plate 30, the spacing of the switch device from the activator plate should be increased slightly. If the warning device does not stop when the switch device is positioned near the end of plate 30, such spacing should be decreased until it does. Somewhat similarly, the supports 54 and 56 are adjustably mounted on a rotatable part 52 and a fixed part of the motor vehicle and adjusted so that the switch system 37 responds to the movement of the activating magnet 36 (and 36'), as desired.

OPERATION

The operation of the apparatus of the apparatus of the present invention is believed to be clearly apparent and is briefly summarized at this point. During cruising on the highway should the motor vehicle operator desire to guard against the lack of or a reduction in alertness because of fatigue or highway hypnosis, the knob K of the apparatus 10 is turned on and set approximately at the desired delay period. If the steering wheel is moved often enough to establish a reversal rate of shorter intervals than the delay set on the apparatus the transistor will be kept in cutoff condition and the warning device 16 will not be actuated. However, should the reversal rate decrease, then the transistor will conduct and the warning device will be actuated for alerting the operator that his alertness or attention to driving is falling off. Should the warning device come on frequently, this is an indication that the operator is not in the best condition for alert driving and should take steps necessary to correct such condition, as by resting. During forward movement of the motor vehicle relative rotation between the activator magnet 36 and the switch system influenced thereby results in an open circuit and relay 32 remains inactivated. However, upon reverse movement of motor vehicle, the activator magnet influences the switch system to close the circuit to the relay which results in the coupling of power to the outside warning device 38 and to the signal generator 14 for activating the warning device 16. To silence the warning devices when the rearward movement has been completed switch DS is actuated. Later, when the vehicle moves forwardly, the switch system is opened, whereupon switch DS may be actuated to enable the safety apparatus.

There has thus been provided a safety apparatus including novel timing circuitry and reed switch systems for alerting the driver as to the condition of his motor vehicle and also alerting bystanders of the reverse movement of the vehicle. It will be appreciated, of course, that the novel reed switch systems are not subject to wear, have no power requirement and are operative with safety in atmospheres which are explosively dangerous in the presence of sparks or arcing, and are capable of broad application, such as in control systems, movement detecting apparatus, space vehicles, etc.

Although the invention has been herein shown and described in what is conceived to be the most practical and preferred embodiment, it is recognized that departures may be made therefrom when the scope of the invention, which is not to be limited to the details disclosed herein but is to be accorded the full scope of the claims so as to embrace any and all equivalent devices and apparatus. For example, annular or horseshoe magnets could be used in place of the bar magnets, where desired.

Having described my invention, what I claim as new and desire to secure by Letters Patent is:

1. A magnetically operable switch system for detecting unidirectional motion, comprising:
   a plurality of magnetically responsive switches connected in circuit series, each of said switches including first magnetic means for closing an electrical circuit therethrough, as a magnetic field is advanced in a first direction therepast, and for interrupting the circuit when said field is advanced in a reversed direction, relative to said first direction; second magnetic means for propagating a magnetic field; and means movable in opposite directions relative to said switches for advancing said second magnetic means in said first and reversed directions past said plurality of switches, whereby an electrical circuit is closed through said plurality of switches when said second magnetic means is moved in said first direction, and said circuit is interrupted when said second magnetic means is moved in said reversed direction, relative to said plurality of switches.

2. An apparatus for detecting a movable part in a predetermined direction comprising:
   a plurality of serially connected reed switches mounted with the reed elements thereof generally in alignment, a plurality of biasing magnets having like poles directed in the same direction with the north-south axes thereof generally aligned with said reed switches, each biasing magnet disposed adjacent a reed switch, respectively, and an activating magnet means disposed generally perpendicular to the alignment of said reed switches and biasing magnet said magnet means having a pole thereof similar to said like poles of said biasing magnets near said alignment.

3. A reed switch system comprising a plurality of reed switches connected in series, a plurality of biasing magnets having like poles directed in a common direction, each biasing magnet being disposed adjacent one of said reed switches and aligned therewith, a magnet control means, including an activating magnet having its north-south axis thereof generally perpendicular to the aligned switches and biasing magnets, movable relative to said reed switches and biasing magnets, being operable to sweep past the same for completing a circuit upon passage in one direction and have the opposite effect upon passage in the opposite direction, whereby with the switch system initially in open condition, movement of the activating magnet in said one direction maintains said condition and movement in an opposite direction puts the switch in closed condition for completing a circuit.

* * * * *